United States Patent [19]
Niebauer et al.

[11] Patent Number: 5,892,151
[45] Date of Patent: Apr. 6, 1999

[54] DIFFERENTIAL INTERFEROMETRIC BALLISTIC GRAVITY MEASUREMENT APPARATUS AND METHOD

[75] Inventors: Timothy M. Niebauer, Boulder; Alan T. Herring, Morrison, both of Colo.

[73] Assignee: EM-g, Inc., Lakewood, Colo.

[21] Appl. No.: 861,121

[22] Filed: May 21, 1997

Related U.S. Application Data

[60] Provisional application No. 60/018,305 May 24, 1996.

[51] Int. Cl.⁶ .................................................... G01M 1/12
[52] U.S. Cl. ............................................................. 73/382 R
[58] Field of Search .............................. 73/382 R, 382 G, 73/800, 152.01

[56] References Cited

U.S. PATENT DOCUMENTS

| | | | |
|---|---|---|---|
| 3,011,346 | 12/1961 | Garvin | 73/382 |
| 3,429,184 | 2/1969 | Russell | 73/382 |
| 3,465,593 | 9/1969 | Stevens et al. | 73/382 |
| 3,688,584 | 9/1972 | Stone et al. | 73/382 |
| 3,693,451 | 9/1972 | Dunlap et al. | 73/382 |
| 3,704,626 | 12/1972 | Stone | 73/382 |
| 3,727,462 | 4/1973 | Stone et al. | 73/382 |
| 3,865,467 | 2/1975 | Von Thuna | 350/102 |
| 4,255,969 | 3/1981 | Lautzenaiser | 73/382 G |
| 4,322,829 | 3/1982 | Davis, Jr. et al. | 367/178 |
| 4,445,371 | 5/1984 | Lautzenhiser | 73/382 R |
| 5,218,864 | 6/1993 | Pennybaker | 73/152 |
| 5,351,122 | 9/1994 | Niebauer et al. | 356/345 |
| 5,448,912 | 9/1995 | Black | 73/152 |
| 5,461,914 | 10/1995 | Zumberge et al. | 73/382 R |
| 5,481,358 | 1/1996 | Dyott et al. | 356/350 |

*Primary Examiner*—Max H. Noori
*Attorney, Agent, or Firm*—John R. Ley; John R. Flanagan

[57] ABSTRACT

A differential interferometric ballistic gravity measurement apparatus and method for measuring differential gravity between separate points employs at least two separate gravity sensors having respective free-fall masses capable of independent operation, an arrangement mounting the gravity sensors independent of one another in respective self-leveling states and at separate locations, a fiber optic-guided laser light interferometer coupled to the gravity sensors and adapted to produce a light signal indicative of a single measurement of differential gravity between the separate locations where the gravity sensors are situated, and a processing control system coupled to the gravity sensor and fiber optic-based laser light interferometer for activating independent operation of the gravity sensors and interferometer and for detecting the light signal and producing an electrical signal representing the measurement of differential gravity between the separate locations.

45 Claims, 4 Drawing Sheets

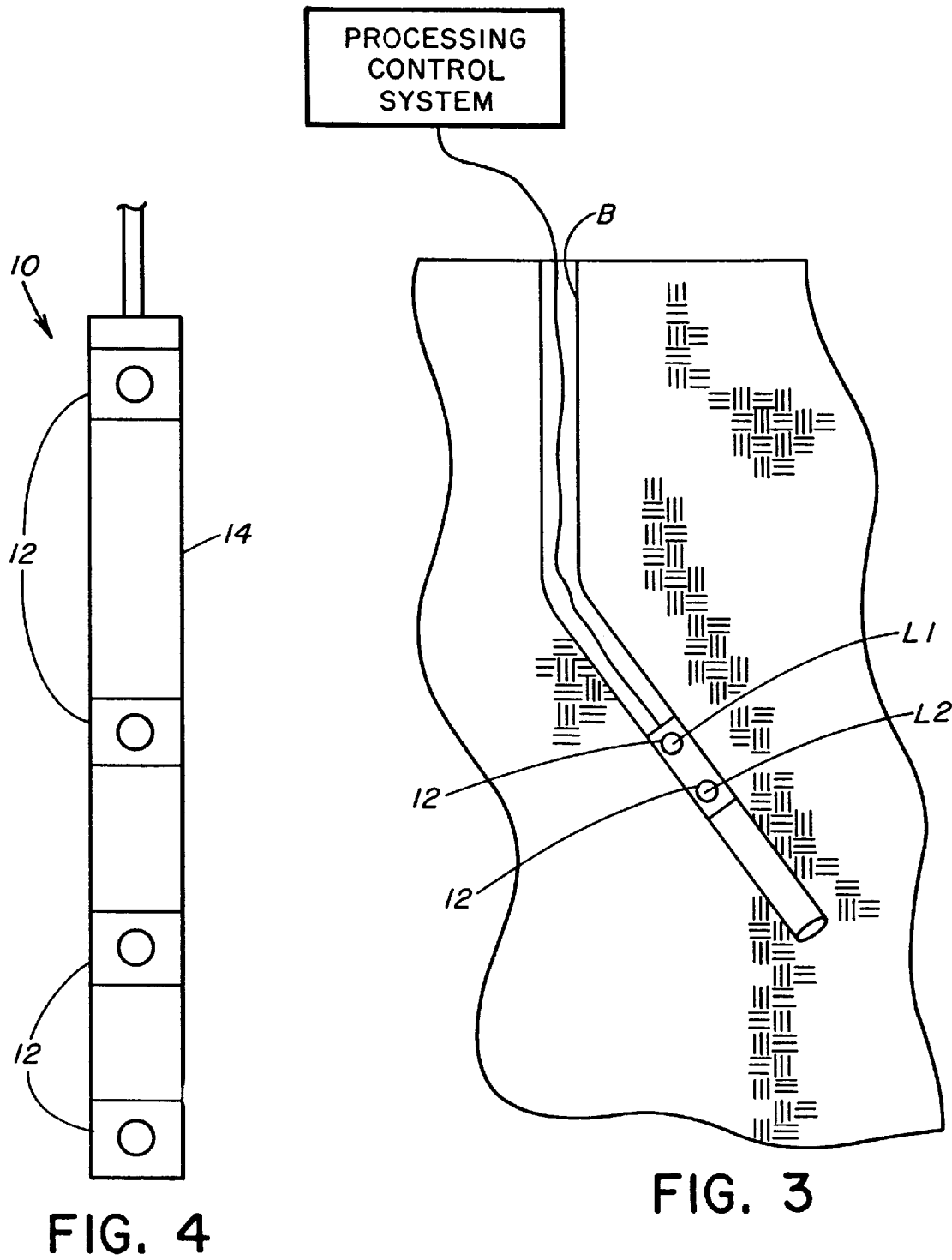

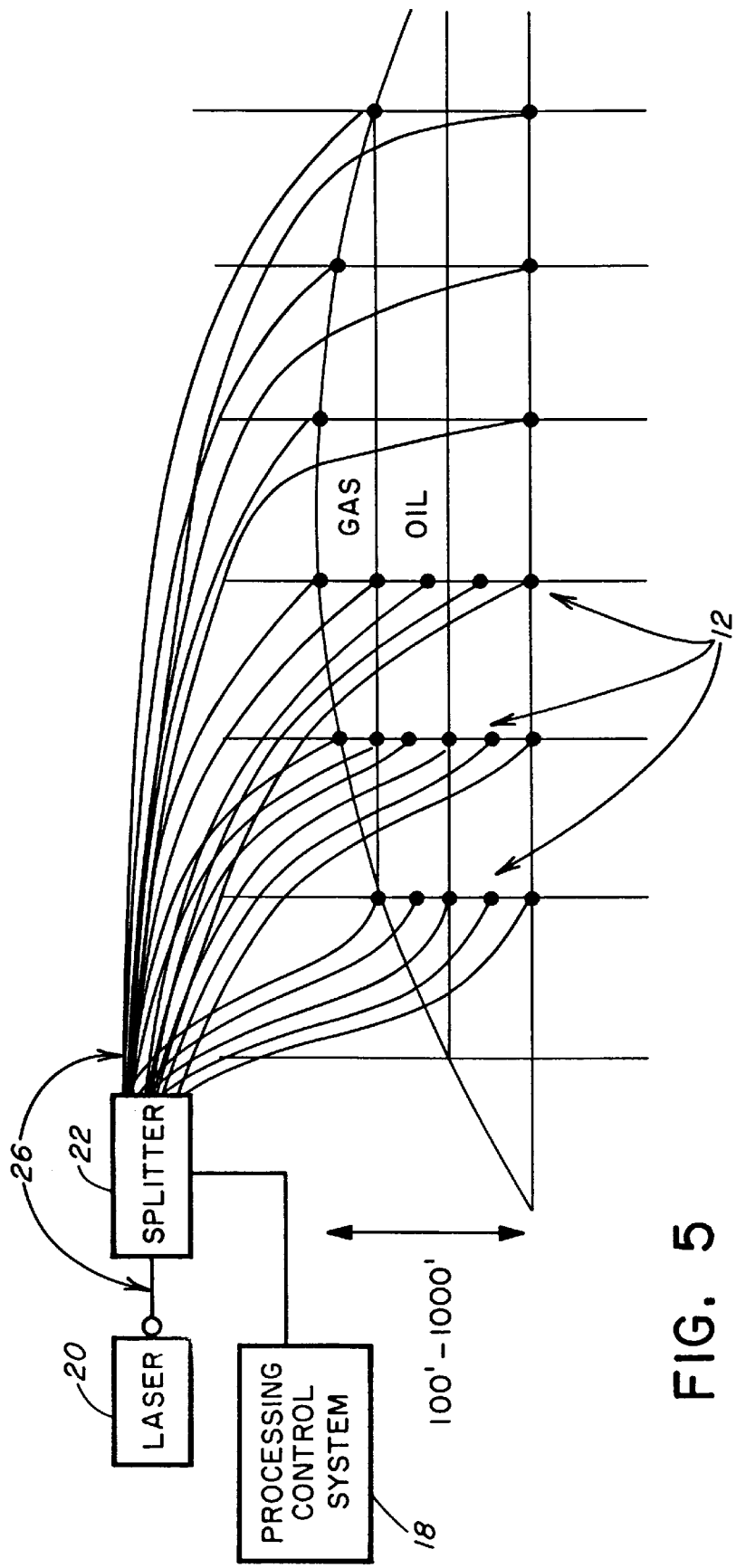

DIFFERENTIAL INTERFEROMETRIC BALLISTIC GRAVITY MEASUREMENT APPARATUS AND METHOD

This application claims the benefit of U.S. provisional application No. 60/018,305, filed May 24, 1996.

BACKGROUND OF THE INVENTION

1. Field of the Invention

The present invention generally relates to apparatus for measuring gravity variations on the earth surface and also in holes drilled into the earth and, more particularly, is concerned with a differential interferometric ballistic gravity measurement apparatus and method.

2. Description of the Prior Art

Relative gravity meters, based on the principle of balancing the weight of a fixed mass with forces from a normal or superconducting spring, are used in measuring gavity variations from point to point on the earth surface and also in holes drilled into the earth. Absolute gravity meters are known which use laser light interferometry to precisely measure the acceleration of a falling mass and thus the absolute value of gravity. Examples are disclosed in U.S. Pat. No. 5,351,122 to Niebauer et al and U.S. Pat. No. 5,461,914 to Zumberge et al. The gravity meters of these patents have one arm of the interferometer in free-fall and the other arm stationary and isolated from ground motion. The gravity meter of the Zumberge et al patent employs a fiber-optic element to direct the laser light and uses the end of the fiber to act as a beam-splitter.

Also, methods for measuring gravity gradient over a fixed vertical interval are described in U.S. Pat. No. 3,693,451 to Dunlap et al, U.S. Pat. Nos. 3,688,584 and 3,727,462 to Stone et al, and U.S. Pat. No. 3,704,626 to Stone. Measuring gravity gradient, as done with the devices disclosed in the Stone patents, implies the fixed positioning of two masses for free-falling in spaced relation along the same vertical axis and measuring gravity at two vertically displaced points.

The devices mentioned above for measuring relative and absolute gravity and gravity gradient have the following drawbacks when used in many practical applications. Many times, they are too large in size to be useful, too time-consuming to setup and calibrate, and too sensitive to environmental conditions that adversely affect their performance and the reliability of their measurements. Relative gravity meters of the spring-type which have been used extensively in boreholes are but one example. They have size and calibration problems; and they are sensitive to temperature changes. Absolute gravity meters also typically suffer from similar problems which limit their range of applications. Both relative and absolute gravity meters are also time-dependent instruments, requiring measurements of gravity to be taken sequentially. The gradient gravity apparatus described above operates only with respect to vertical gradient.

Consequently, a need exists for innovation in the design and development of a gravity measurement apparatus which will retain beneficial features of some of these prior art meters and apparatus but not their drawbacks nor substitute new drawbacks in their place.

SUMMARY OF THE INVENTION

The present invention provides a differential interferometric ballistic gravity measurement apparatus and method designed to satisfy the aforementioned need. The differential gravity measurement apparatus of the present invention preferably incorporates multiple independent self-leveling sensors connected by a fiber optic-guided laser light interferometer arrangement.

Thus, a first unique concept of this invention is the provision of at least two independent gravity sensors having chambers with free-fall masses that can be placed anywhere and independently set up by use of interconnected fiber optic cables. The aforementioned Stone patents only discloses two bodies falling in the same chamber and they are rigidly connected. A second unique concept is to have more than two gravity sensors. A third unique concept is to split the laser beam to multiple gravity sensors where free-fall masses are thrown/dropped simultaneously and where their signals are returned and recombined but have different frequencies corresponding to relative velocity between each sensor pair. One can compare any two pairs out of the multiple sensors and take measurements quickly. A fourth unique concept is to use the multiple sensors to measure X, Y, Z differential gravity in three (3-D) dimensional space.

For measurement of the variation of the value of gravity from one point to another, the differential interferometric ballistic gravity measurement apparatus of the present invention, hereinafter termed the DGM apparatus, employs at least two independent preferably self-leveling gravity sensors with their own respective free-fall masses. The gravity sensors can be placed at separate points and are linked by a fiber optic-guided laser light interferometer to make one measurement of the difference in the absolute gravity between the two points where the independent gravity sensors are located. This gravity difference, called "differential gravity", between the two points is more easily and accurately accomplished in a timely fashion through making one measurement in the aforementioned manner than the alternative of making two separate measurements of absolute gravity at separate times and then substracting one measurement from the other.

Another important innovation of the subject invention is that gravity differences between multiple points (more than two) can be measured simultaneously by the DGM apparatus using more than two gravity sensors. This is possible because the DGM apparatus of the invention is symmetric with respect to each arm of the interferometer. Additional arms can be added without affecting the principal of operation. The apparatus of the subject invention has the advantage of less stringent precision demands made on the laser-light wavelength and time source and more accurate and stable calibration. No calibration at established points where the value of gravity has been measured and established need be done like in the case of spring balance relative gravity meters. Common mode factors affecting all gravity sensors of the apparatus can be safely ignored.

The DGM apparatus of the subject invention, while employing some features from the meters of both the Zumberge and Stone patents, is a significant extension and expansion of technology beyond them. Like the Zumberge patent, the DGM apparatus of the subject invention employs a fiber optic-based interferometer. And, like the Stone patents, the apparatus of the subject invention employs at least two free-falling masses. However, the DGM apparatus of the subject invention departs and differs from the absolute gravity meter of the Zumberge et al patent in that both arms, or in the case of the apparatus of the subject invention both sensors, at opposite ends of the fiber optic are free-falling and the apparatus measures difference in gravity or differential gravity, not absolute gravity. The subject invention does not use the end of the fiber as a beam-splitter as is described by the Zumberge patent. The DGM apparatus of the subject invention differs from the vertical gravity gradient meter of the Stone patents in that the gravity sensors of the subject apparatus can be moved to different points, not vertically aligned, and the sensors then measure differential gravity between those points. In particular, the subject invention can have the freely falling masses situated horizontally with respect to each other. Neither the Stone or Zumberge patents describe an instrument with more than two independently spaced sensors.

One important application of the DGM apparatus of the subject invention is its use in highly deviated boreholes. The vertical gravity gradient measuring device of the Stone patents would not work in boreholes because boreholes are never straight nor vertical. The subject apparatus will work in any deviated, even horizontal, borehole since it measures the difference in gravity between two points anywhere. The freely falling sensors can be independently levelled. The subject invention can employ more than two sensors in order to measure differential gravity at different points simultaneously. In one special case, the subject apparatus can have four sensors placed so that the vertical gravity gradient and the two horizontal gravity gradients are measured simultaneously. This will produce a vector field measurement of the differential gravity.

Accordingly, the present invention is directed to the differential interferometric ballistic gravity measurement (DGM) apparatus for measuring differential gravity between separate locations. The DGM method of the present invention is directed to the sequence of steps performed by the DGM apparatus.

The DGM apparatus comprises: (a) at least two separate gravity sensors having respective free-fall masses capable of independent operation; (b) means for mounting the gravity sensors independent of one preferably in respective self-leveling states and at separate locations; (c) a fiber optic-guided laser light interferometer coupled to the gravity sensors and adapted to produce a light signal indicative of a single measurement of differential gravity between the respective separate locations where the gravity sensors are situated; and (d) processing control means coupled to the gravity sensors and fiber optic-guided laser light interferometer for activating independent, preferably concurrent, operation of the gravity sensors and interferometer and for detecting the light signal and producing an electrical signal representing the measurement of differential gravity between the separate locations.

More preferably, each of the gravity sensors includes a sealed chamber, a sensor head disposed in the sealed chamber, and means for mounting the sensor head within the sealed chamber so as to permit rotation of the sealed chamber relative to the sensor head to provide the self-leveling state of the sensor head relative to the sealed chamber. The sensor head includes an enclosure, a fiber optic transmission port attached to the enclosure, a test mass with a retroreflector mounted thereto and optically aligned with the port, a support platform attached to and extending across the enclosure for releasably supporting the test mass at a rest position, and a launch mechanism mounted on the support platform and being activatable from the processing control means to cause launching of the test mass into a free-fall state relative to the support platform and then under the influence of gravitational acceleration return back to the rest position on the support platform.

The fiber optic-guided laser light interferometer includes a laser for generating a laser light beam and an arrangement of components interconnecting the laser, the processing control means, and the ports of the gravity sensor heads for linking the laser light beam from the laser to and from the retroreflectors of the gravity sensor heads and to the processing control means. The arrangement of components includes a beam splitter and a system of fiber optic cables. The fiber optic cables receive the laser light beam from the laser and guide respective portions of the laser light beam to the respective ports of the gravity sensor heads and the retroreflectors thereof after being split into the laser light beam portions by the beam splitter. The fiber optic cables also receive and guide the laser light beam portions from the ports of the gravity sensor heads after reflection by the retroreflectors and input the laser light beam portions as a recombined laser light beam to the processing control means after recombination by the beam splitter such that the processing control means can then detect and process the recombined laser light beam for producing the electrical signal representing the measurement of differential gravity between the respective separate locations where the gravity sensors are situated.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a diagrammatic view of the DGM apparatus of FIG. 1 positioned in a deviated borehole.

FIG. 4 is a diagrammatic view of another embodiment of the DGM apparatus applied as a borehole well-logging tool employing a plurality of spaced gravity sensors.

FIG. 5 is a diagrammatic view of still another embodiment of the apparatus applied as a reservoir monitoring tool employing a multiplicity of gravity sensors coupled to an end of a fiber optic cable fed by a common laser through a beam splitter.

DETAILED DESCRIPTION OF THE INVENTION

Figures 1, 2:
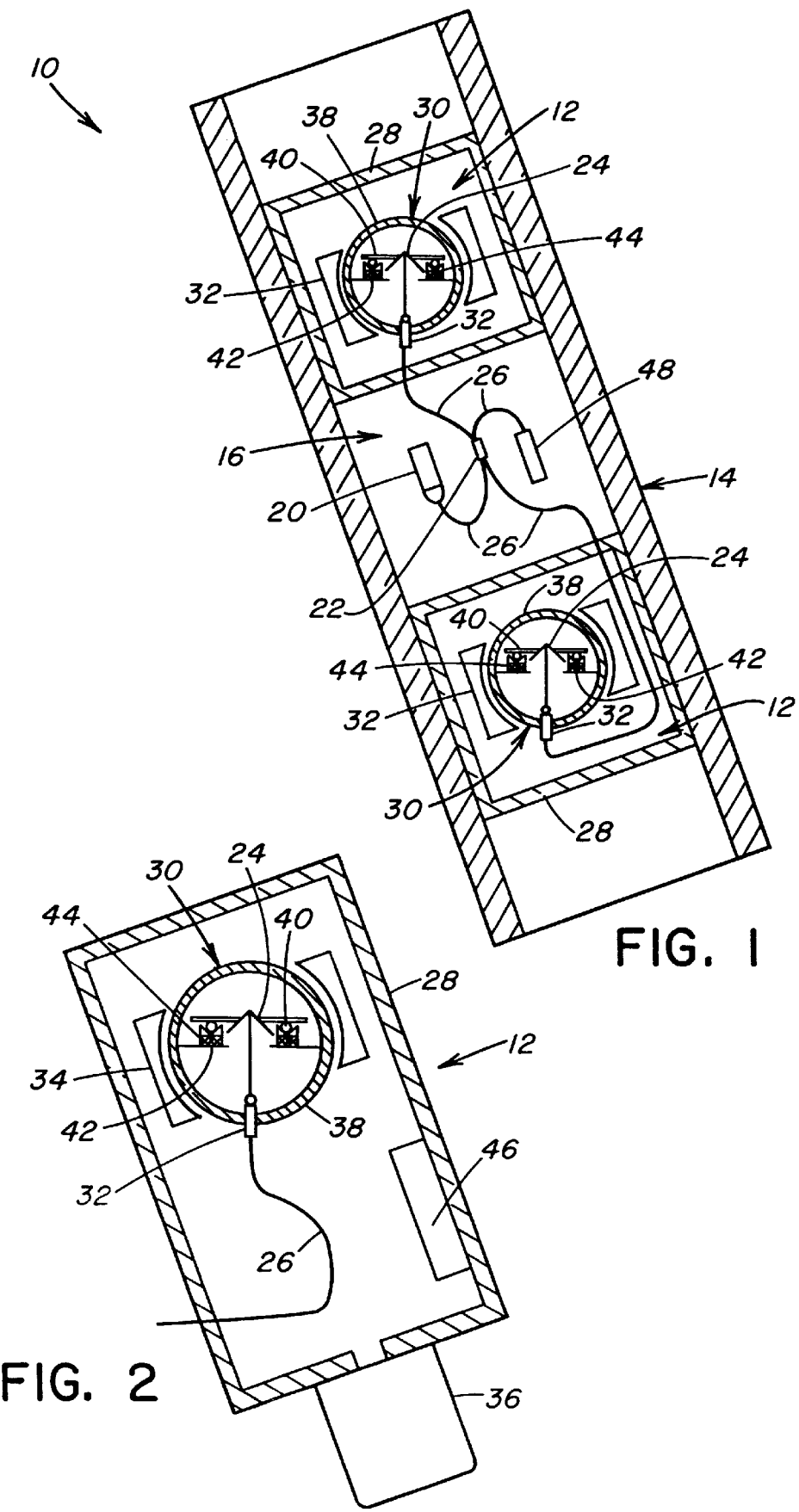
FIG. 1 is a diagrammatic view of a preferred embodiment of the differential interferometric ballistic gravity measurement apparatus of the present invention.
FIG. 2 is a diagrammatic view of one of the pair of gravity sensors employed in the DGM apparatus of FIG. 1.

Referring to the drawings and particularly to FIGS. 1–3, there is illustrated in a diagrammatic form the differential interferometric ballistic gravity measurement (DGM) apparatus of the present invention, generally designated 10. Although not so limited in its applications, the DGM apparatus 10 is particularly adapted for application as a borehole tool, such as seen in a simplified diagrammatic form in FIG. 4.

Basically, the DGM apparatus 10 includes at least two separate gravity sensors 12 having respective free-fall masses capable of independent operation, means in the form of a casing 14 mounting the gravity sensors 12 independent of one another in respective self-leveling states and at two separate locations L1, L2 (see FIG. 3), a fiber optic-guided laser light interferometer 16 coupled to the gravity sensors 12 and adapted to produce a light signal indicative of a single measurement of the differential gravity between the respective two locations L1, L2 where the gravity sensors 12 are situated, and a processing control system 18 (see FIG. 6) coupled to the gravity sensors 12 and fiber optic-guided laser light interferometer 16 for activating independent, preferably concurrent, operation of the gravity sensors 12 and the interferometer 16 and for detecting the light signal and producing an electrical signal representing the single measurement of differential gravity between the two separate locations.

More particularly, referring specifically to FIG. 1, the fiber optic-guided laser light interferometer 16 includes a laser 20, such as a gas or diode laser, activated by the processing control system 18 for generating a laser light beam and an arrangement of optical and fiber optic components coupling the laser 20 to the gravity sensors 12 and the processing control system 18. Specifically, the arrangement of components includes a beam splitter 22, retroreflectors 24 in the respective gravity sensors 12, and a system of fiber optic cables 26. The fiber optic cable system 26 receives the laser light beam from the laser 20 and guides respective portions of the laser light beam to the gravity sensors 12 after being split into the laser light beam portions by the beam splitter 22. The fiber optic cable system 26 then guides the laser beam light portions from the gravity sensors 12 after reflection from the respective retroreflectors 24 and inputs the laser light beam portions as a recombined laser beam to the processing control system 18 after recombination by the beam splitter 22. The processing control system 18 detects and processes the recombined laser beam to provide the electrical signal representing the single measurement of differential gravity between the two separate locations where the respective gravity sensors 12 are situated.

Referring specifically to FIG. 2, there is a diagrammatic illustration of one of the two basic gravity sensors 12 employed in the DGM apparatus 10 of the subject invention. Since the gravity sensors 12 are identical to one another in their construction, only one needs to be described in detail. The gravity sensor 12 includes a sealed chamber 28, a sensor head 30 disposed in the chamber 28, an fiber optic transmission port 32 on the sensor head 30, and a gimbal mount 34 mounting the sensor head 30 within the chamber 28 for permitting rotation of the chamber 28 relative to the sensor head 30 so as to provide the sensor head 30 in an auto- or self-leveling state relative to the vertical. The detailed construction of the gimbal mount 34 is well-known to those of ordinary skill in the art and so need not be illustrated and described herein. The sealed chamber 28 is evacuated in any suitable manner such as by use of an ion vacuum pump 36 coupled in communication with one end of the chamber 28.

The sensor head 30 includes an enclosure 38, a free-fall test mass 40 with the retroreflector 24 mounted thereto and optically aligned with the fiber optic transmission port 32 also mounted to the enclosure 38, a support platform 42 attached to and extending across the enclosure 38 and releasably supporting the test mass 40 at a rest position, and a suitable launching mechanism 44, one example of which being a piezoelectric element, mounted on the support platform 42 between it and test mass 40. The launching mechanism 42 is activated by the processing control system 18 for operation, concurrently with operation of the laser 20, causing the test mass 40 to be thrown vertically through a small distance above the support platform 42. Then, due to gravitational acceleration the test mass 40 returns back down to the rest position on the support platform 42. A conventional tiltmeter 46 is preferably disposed in the sealed chamber 28 which can be remotely monitored in a manner well-known to those of ordinary skill in the art to ensure that the sensor head 30 is level when launching of the test mass 40 is to take place. Alternatively, the launching mechanism 44 can be provided in a form which drops the test mass 40 from above the support platform 42, instead of throwing it. Suitable mechanisms for launching the test mass 40 in these different modes, such as motors and springs rather than piezoelectric elements, are well-known to those of ordinary skill in the art. For instance, reference can be made to U.S. Pat. No. 5,351,122 to Niebauer et al for a description of throw and drop mechanisms therein. The disclosure of the Niebauer et al patent is hereby incorporated herein by reference thereto. It makes no difference whether the mass is thrown or dropped as long as it undergoes free fall.

FIG. 3 is a diagrammatic illustration of the DGM apparatus 10 positioned in a deviated borehole B. FIG. 4 diagrammatically illustrates a borehole well-logging tool having three gravity sensors 12 spaced at one, five and ten meter intervals from one gravity sensor 12 so as to provide gravity measurements over these baselines. That is an important application which will make well-logging more efficient. In a well-logging application, measurements of differential gravity in a borehole relate directly to the logging of density variations. FIG. 5 is a diagrammatic illustration of another application of the subject invention wherein the DGM apparatus 10 includes a multiplicity of the gravity sensors 12 coupled on the end of the fiber optic cable 26 fed by a common laser 20 via a beam splitter 22 with the split portions of the laser light beam reflecting back and mixing together and then detected and processed by the processing control system 18. The test masses 40 of the gravity sensors 12 can either be launched at different times or all at the same time and the information recovered at once. Some of the various fields of application are boreholes, reservoirs, surface gravity explorations, airborne, on a boat, engineering, buried bodies such as tanks. These applications are by way of examples and not limitation. With respect to these applications, key advantages of the DGM apparatus 10 as a borehole tool is the provision of at least two free-fall chambers 28 wherein laser light and falling test masses 40 are not affected by the adverse environment down a borehole and wherein the two chambers 28 are independently leveled and are independent systems which can be moved anywhere relative to one another. The use of fiber optic cable system 26 permits the gravity sensors 12 to be placed at various locations and take readings of differences in the gravity experienced by each sensor head 30.

In the case of launching of more than two sensors 12 at the same time, the fiber beam splitter 22 can be made to mix the light returning from all the different sensor heads 30 into one output light beam. All of the information corresponding to relative gravity between each pair of gravity sensors 12 is encoded into fluctuations in the light amplitude at the output fiber end. Different starting delays for each gravity sensor 12 can be introduced so that each signal corresponding to relative gravity between any pair of sensors 12 is located at a different base frequency. Each signal corresponding to differential gravity between a given sensor pair can be demodulated from the output waveform with either analog or digital demodulation schemes used in radio or other communications applications. For example, each base frequency can be demodulated by mixing the output waveform with a standard analog or digital reference signal and low pass filtering to give the slowly varying differential gravity signal from any given pair of sensors 12. This can be done for any or all of the different base frequencies at the same time using parallel modules that demodulate a specific frequency. In the case of digital signal processing, the task could be done using one CPU or several ganged parallel CPUs each handling an individual frequency component.

Figure 6:
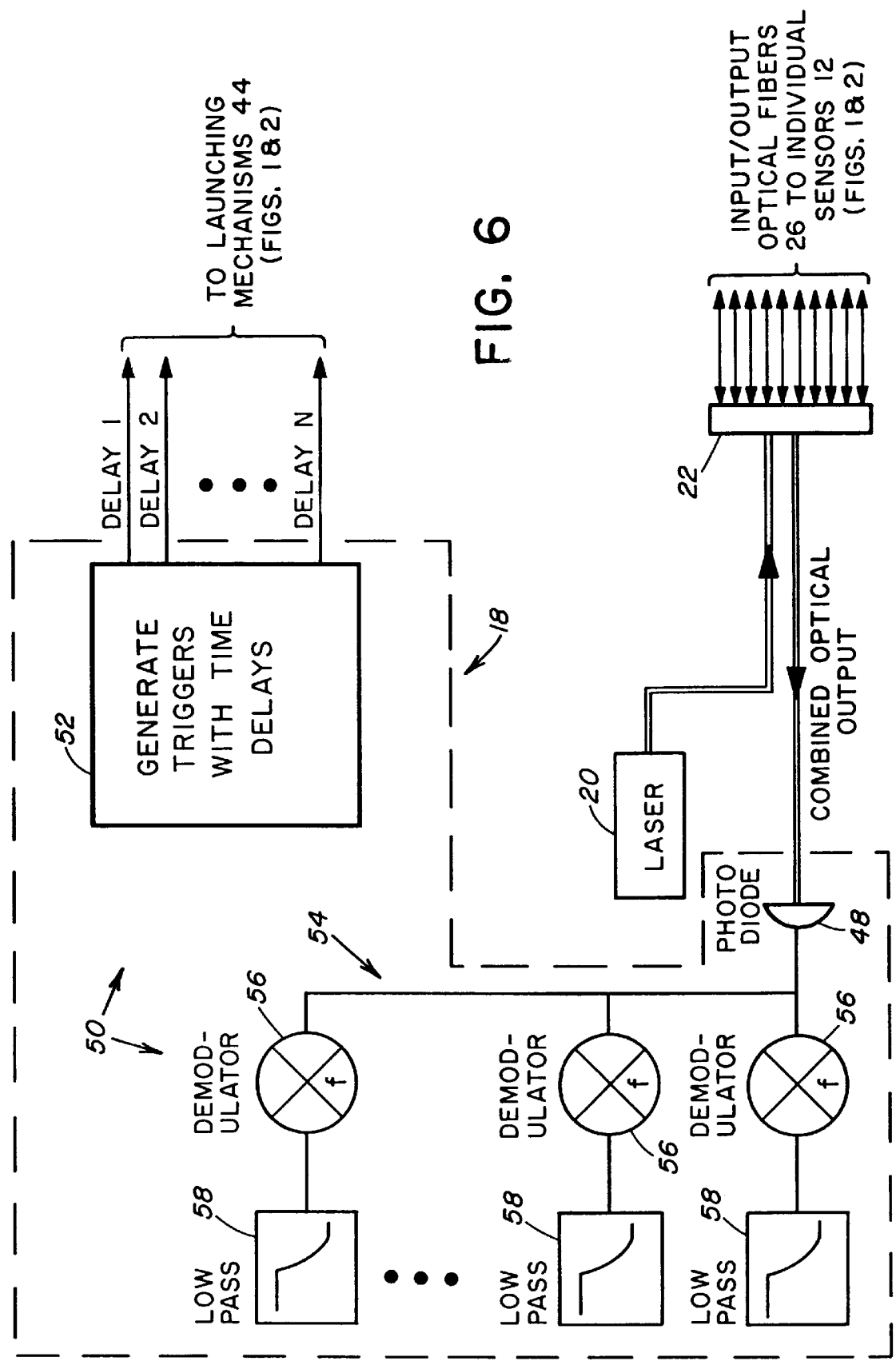
FIG. 6 is a block diagram of processing control system of the DGM apparatus.

Referring to FIG. 6, there is illustrated in block diagram form, the processing control system (PCS) 18 of the DGM apparatus 10. The PCS 18 includes a detector 48 such as a photo diode which is coupled to return optical fibers of the fiber optic cable system 26 via the beam splitter/recombiner 22 for receiving the recombined laser beam therefrom. The PCS 18 also includes a system controller (a CPU or other automatic control system) 50 that performs two basic functions, trigger generation and signal processing, as indicated by respective blocks 52 and 54 in FIG. 6, meaning that the controller 50 generates triggers to initiate free fall of the test masses and processes the returned optical signal.

More particularly, in the general case of the subject invention there are many independent free-fall chambers. With respect to the trigger generation function represented by block 52, the PCS 18 generates triggers for each sensor 12 to initiate a measurement. In the case where there are many test masses, the PCS 18 may generate the triggers with a different delay between each. The delay will cause the initial velocities of each test mass to be different. Delays are chosen so that each pair of sensors 12 has a distinct initial velocity difference.

With respect to the signal processing function represented by block 54, the optical interference between two sensors 12 creates an amplitude modulation of the light intensity that occurs at a base frequency, f, given by $f=2V_o/\lambda$, where $V_o$ is the initial velocity and $\lambda$ is the wavelength of the laser light. This relation can be expressed in terms of the time delay, $\delta t$, between the starting times to give, $f=(2g\delta t)/\lambda.0$. Thus, a 1 ms delay would create a base frequency of 30 kHz. The differential gravity signal is manifest by a small change of this base frequency. If appropriate time delays are chosen, it is possible to have all the differential gravity signals available simultaneously on a single optical fiber separated in the frequency domain. The differential gravity between any pair of sensors is obtained by demodulating the base frequency of interest. Parallel processing of each frequency allows the differential gravity between all the sensor pairs to be measured simultaneously.

The task of signal recovery is substantially the same as that faced by conventional FM radio or telephone communications and there are many well-known techniques that can be employed. One technique is to detect the returning light signal using the standard photodiode 48 and demodulating each base frequency using a parallel bank of tuned receivers 56. Each tuned receiver 56 mixes the main signal with its characteristic base frequency and applies it to a low pass filter 58 to remove the other base frequencies. The differential gravity signal appears as a slow modulation of the phase near dc which can be detected using digital software techniques. It is, in general, possible to process the signals at any stage using any combination of optical, analog or digital demodulation schemes. In particular, the electrical signal can also be digitized using a standard A/D converter and the signal processing can be done completely in software.

In the case that only two sensors are employed, it is possible to time the zero-crossings of each passing fringe and measure differential gravity in the same way described by the above-referenced Niebauer et al patent.

The DGM apparatus 10 of the present invention thus provides a means to make differential gravity measurements using multiple ballistic sensor heads 30 linked by a fiber optic cable system 26. With the individual sensor heads 30 in self-leveled states, a signal from the remote source can be given to activate the launching mechanism 44 for the test mass 40 of each individual sensor head 30. Each launch signal can be given a selectable delay to set the frequency difference between pairs of sensor heads 30. The differential path length between the sensor heads 30 is encoded into the phase differences in the light combined between pairs of cables. The optical phase difference is proportional to the differential position of the two test masses 40. This differential position information is calibrated absolutely by knowing the frequency of the laser 20 as long as the test masses 40 are in a vacuum. The first derivative of the optical phase difference is proportional to the differential velocity of the two test masses 40. This can be selected (or adjusted) by introducing a delay between the start times of the launch of the two masses 40. The initial velocity difference gives the base frequency needed for signal detection. A higher initial velocity difference leads to a greater signal frequency. The second derivative of the optical phase difference is proportional to the differential acceleration or gravity of the two test masses 40.

Relative gravity measurements are used extensively in mineral and petroleum exploration as well as in a wide range of applications that make use of the relation between variations in gravity and variations in subsurface density. Subsurface density variations relate to geologic or other buried structure. Also, changes in gas or fluid distributions which occur in petroleum or hydrothermal reservoirs are diagnostically reflected by a small change in gravity. Accurate measurement of changes in gravity can therefore be used to monitor or detect buried resources or waste products.

To reiterate, the broad concept of the subject invention is the provision of the differential gravity measuring apparatus and method which utilizes multiple independent gravity sensors 12 with respective sensor heads 30 having test masses 40 which can be observed in free-fall by means of a laser interferometer 16 linked with the sensors 12 by fiber-optic cable 26 and wherein comparison of difference in fall rates can be made which directly relates to the difference in gravity between any pair of multiple sensors 12. The broad concept also covers the use of a symmetric interferometric system which allows more than two sensor heads 30 to be linked with a fiber optic communication. Further the subject invention broadly includes a method for letting more than two sensor masses free-fall at the same time and separating the relative gravity signal from all pairs simultaneously from a single fiber output. The method includes introducing distinct delays in the start time of each sensor 12, mixing the light returning from all of the sensor heads 30 into one output fiber, and finally demodulating the individual differential gravity signals at different frequencies.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A differential interferometric gravity measurement apparatus for measuring a differential in gravity between a plurality of physically separated locations, said apparatus comprising:

a gravity sensor located at each physically separated location, each gravity sensor including a test mass selectively moveable into free-fall movement, the characteristics of the free-fall movement of the test mass resulting from the influence of gravity at the location of the gravity sensor;

a laser light source positioned at a physically separated location from each gravity sensor, the laser light source creating an optical beam having predetermined frequency characteristics;

a detector positioned at a physically separated location from each gravity sensor, the detector generating response signals related to response light signals applied thereto;

fiber optic cabling extending between the laser light source, the detector and each gravity sensor, the fiber optic cabling guiding the optical beam from the laser light source to each gravity sensor, the fiber optic cabling also guiding a response light signal from each gravity sensor to the detector, the response light signal resulting from reflection of the optical beam by the test mass during free-fall movement; and a signal processor connected to the detector and operative to compare the response signals originating from at least one pair of gravity sensors and to determine the difference in gravity at respectively different physically separated locations of each pair of gravity sensors.

2. Apparatus as defined in claim 1 wherein:

each gravity sensor includes a port to which the fiber optic cabling is connected; and the optical beam is delivered at the port; and the response light signal is received at the port.

3. Apparatus as defined in claim 1 further comprising:

a beam splitter connected between the laser light source and the fiber optic cabling, the beam splitter projecting the optical beam from the laser light source into the fiber optic cabling; and a beam recombiner connected between the fiber optic cabling and the detector, the beam recombiner combining the response light signals from each gravity sensor into a combined response optical signal which is applied to the detector.

4. Apparatus as defined in claim 3 wherein:

the beam splitter and the beam recombiner are a single splitter/recombiner unit;

the fiber optic cabling comprises a single fiber optic cable extending between each gravity sensor and the beam splitter/recombiner; and the beam splitter/recombiner is positioned at a physically separated location from each gravity sensor.

5. Apparatus as defined in claim 1 wherein:

the plurality of gravity sensors is at least three in number;

the response light signals from the gravity sensors are separated in the frequency domain; and the signal processor further comprises a demodulator connected to the detector, the demodulator demodulating signals related to the frequency domain-separated light response signals.

6. Apparatus as defined in claim 1 wherein:

the plurality of gravity sensors is at least three in number;

the signal processor creates signals representing differential gravity within the space established by the physically separated gravity sensors by the comparison of response signals originating from selected pairs of the gravity sensors.

7. Apparatus as defined in claim 1 wherein:

the plurality of gravity sensors is at least three in number; and said apparatus further comprises:

a selectively activatable launch mechanism for the test mass of each gravity sensor, the launch mechanism initiating the free-fall movement of the test mass when activated; and a trigger generator connected to the launch mechanism of each gravity sensor to activate each launch mechanism to initiate the free-fall movement of each test mass.

8. Apparatus as defined in claim 7 wherein:

the trigger generator activates each launch mechanism at a different time.

9. Apparatus as defined in claim 7 wherein:

the trigger generator activates each launch mechanism to cause free-fall movement of all the test masses simultaneously.

10. Apparatus as defined in claim 7 wherein:

the trigger generator activates each launch mechanism at a different time and to cause simultaneous free-fall movement of all the test masses to separate the response light signals from one another in the frequency domain.

11. Apparatus as defined in claim 7 wherein the launch mechanism drops the test mass into the free-fall movement.

12. Apparatus as defined in claim 7 wherein the launch mechanism throws the test mass to obtain free-fall movement.

13. Apparatus as defined in claim 7 wherein each gravity sensor includes:

a sealed evacuated chamber;

a sensor head disposed in the chamber, the sensor head containing the test mass; and a movable connection between the sensor head and the chamber to move the sensor head into a level condition by relative movement of the sensor head and the chamber, the level condition establishing vertical free-fall movement of the test mass.

14. Apparatus as defined in claim 13 wherein said sensor head further comprises:

an enclosure containing the test mass and the launch mechanism;

a support platform attached to and extending across the enclosure for supporting the test mass at a rest position and for returning the test mass to the rest position after the test mass has undergone free-fall movement; and a port connected to the enclosure, the fiber optic cabling connecting to the port, the optical beam being delivered at the port, and the response light signal being received at the port.

15. Apparatus as defined in claim 14 wherein:

the launch mechanism is mounted on said support platform.

16. Apparatus as defined in claim 15 wherein:

each gravity sensor is positioned within an elongated casing of a well-logging tool;

the casing is adapted to be positioned in an underground borehole; and the gravity sensors are spaced apart longitudinally along the casing.

17. Apparatus as defined in claim 16 wherein:

the gravity sensors are spaced from one another by multiples of the spacing between the closest two of the gravity sensors in the casing.

18. Apparatus as defined in claim 17 wherein:
the laser light source, the detector and the signal processor are also located in the casing.

19. Apparatus as defined in claim 1 wherein:
each gravity sensor further includes a selectively activatable launch mechanism for the test mass, the launch mechanism initiating free-fall movement of the test mass when activated;
each gravity sensor is positioned within an elongated casing of a well-logging tool, the casing adapted to be positioned in an underground borehole, the gravity sensors are spaced apart longitudinally along the casing; and said apparatus further comprises:
a trigger generator connected to the launch mechanism of each gravity sensor to activate each launch mechanism to initiate the free-fall movement of each test mass.

20. Apparatus as defined in claim 19 wherein:
a movable connection between each gravity sensor and the casing to move each gravity sensor into a level condition independently of each other gravity sensor by relative movement of each gravity sensor and the casing, the level condition establishing vertical free-fall movement of the test mass of each gravity sensor.

21. Apparatus as defined in claim 20 wherein:
the gravity sensors are spaced from one another by multiples of the spacing between the closest two of the gravity sensors in the casing.

22. Apparatus as defined in claim 20 wherein:
the laser light source and the detector are also located in the casing.

23. A differential interferometric gravity measurement apparatus for measuring a differential in gravity between a plurality of at least three physically separated locations, said apparatus comprising:
a gravity sensor located at each physically separated location, each gravity sensor including a test mass selectively moveable into free-fall movement, the characteristics of the free-fall movement of the test mass resulting from the influence of gravity at the location of the gravity sensor;
each gravity sensor having an input optical beam projecting onto the test mass during free-fall movement, the input optical beam of each gravity sensor being the same as the input optical beam of each other gravity sensor;
each gravity sensor also developing a response signal related to the reflection of the input optical beam from the test mass during free-fall movement;
each gravity sensor also including a selectively activatable launch mechanism for the test mass to initiate free-fall movement of the test mass when activated;
a trigger generator connected to the launch mechanism of each gravity sensor to activate each launch mechanism to cause pairs of the test masses to experience free-fall movement simultaneously; and
a signal processor connected to each gravity sensor and receptive of the response signal to compare the response signals originating from pairs of gravity sensors and to determine the difference in gravity at respectively different physically separated locations of the pair of gravity sensors.

24. Apparatus as defined in claim 23 wherein:
the trigger generator activates each launch mechanism to initiate the free-fall movement of each test mass at a different time.

25. Apparatus as defined in claim 23 wherein:
the trigger generator activates each launch mechanism to cause free-fall movement of all the test masses simultaneously.

26. Apparatus as defined in claim 23 wherein:
the trigger generator activates each launch mechanism to cause free-fall movement of at least three of the test masses simultaneously;
the response signals from each gravity sensor are separated in the frequency domain; and
the signal processor further demodulates the frequency domain-separated response signals.

27. Apparatus as defined in claim 23 wherein the trigger generator and the signal processor are positioned at a physically separated location from each gravity sensor.

28. Apparatus as defined in claim 23 wherein:
the input optical beam for each gravity sensor originates from a laser light source;
the laser light source is positioned at a physically separated location from each gravity sensor; and
fiber optic cabling extends between the laser light source and each gravity sensor to guide the input optical beam to each gravity sensor.

29. A method of measuring a differential in gravity between a plurality of physically separated locations, comprising the steps of:
locating a test mass at each physically separated location;
generating an optical beam having predetermined frequency characteristics from a laser light source;
positioning the laser light source at a physically separated location from each test mass;
selectively moving each test mass into free-fall movement, the characteristics of the free-fall movement of each test mass resulting from the influence of gravity at the location of each test mass;
guiding the optical beam through a fiber optic cable from the laser light source to each location of a test mass;
projecting the optical beam from the fiber optic cable onto each test mass while in free-fall movement;
reflecting the optical beam from the test mass during free-fall movement as a response light signal;
guiding the response signal through a fiber optic cable to a detector;
creating signals related to the response light signal by operating the detector;
positioning the detector at a physically separated location from each test mass;
comparing the signals from the detector which are related to the response light signals from at least one pair of test masses; and
determining the difference in gravity from the comparison of each pair of signals.

30. A method as defined in claim 19 further comprising the steps of:
splitting the optical beam generated by the laser light source into a plurality of separate fiber optic cables extending to each test mass;
combining the response light signals from each test mass guided by a plurality of separate fiber optic cables into a combined response optical signal; and
applying the combined response optical signal to the detector.

31. A method as defined in claim 19 further comprising the steps of:

locating a test mass at each of at least three physically separated locations;

separating the response light signals from each test mass in the frequency domain; and demodulating signals related to the frequency domain-separated light response signals.

32. A method as defined in claim 29 further comprising the step of:

locating a test mass at each of at least three physically separated locations; and establishing the differential in gravity within the space established by the physically separated test masses by comparing the signals related to the light response signals originating from selected pairs of the test masses.

33. A method as defined in claim 29 further comprising the steps of:

locating a test mass at each of at least three physically separated locations; and selectively initiating free-fall movement of each test mass at a different time.

34. A method as defined in claim 29 further comprising the steps of:

locating a test mass at each of at least three physically separated locations; and selectively initiating free-fall movement of each test mass to cause free-fall movement of all the test masses simultaneously.

35. A method as defined in claim 29 further comprising the steps of:

locating a test mass at each of at least three physically separated locations; and selectively initiating free-fall movement of each test mass at a different time and to cause free-fall movement of all the test masses simultaneously.

36. A method as defined in claim 29 further comprising the step of:

orienting each test mass for vertical free-fall movement after locating each test mass at each location.

37. A method as defined in claim 29 further comprising the steps of:

incorporating each test mass within an elongated casing of a well-logging tool;

positioning the casing in an underground borehole; and spacing the test masses longitudinally apart from one another along the casing.

38. Apparatus as defined in claim 37 further comprising the step of:

spacing the test masses from one another by multiples of the spacing between the closest two of the test masses in the casing.

39. A method as defined in claim 37 further comprising the step of:

orienting each test mass for vertical free-fall movement independently of each other test mass after positioning the casing in an underground borehole.

40. A method as defined in claim 29 further comprising the step of:

locating each test mass in spaced relation to one another in a common underground borehole.

41. A method as defined in claim 29 further comprising the step of:

locating each test mass in a different underground borehole.

42. A method of measuring a differential in gravity between a plurality of at least three physically separated locations, comprising the steps of:

locating a test mass at each physically separated location;

selectively moving pairs of the test masses into simultaneous free-fall movement, the characteristics of the free-fall movement of each test mass resulting from the influence of gravity at the location of each test mass;

providing an optical beam at each test mass that is the same as the optical beam provided at each other test mass;

projecting the optical beam onto each test mass while in free-fall movement;

reflecting the optical beam from each test mass during free-fall movement as a response light signal;

comparing signals related to the response signals originating from pairs of test masses; and determining the difference in gravity at respectively different physically separated locations from the comparison of signals from each pair of test masses.

43. A method as defined in claim 42 further comprising the step of:

initiating the free-fall movement of each test mass at a different time.

44. A method as defined in claim 43 further comprising the steps of:

separating the response signals from each test mass in the frequency domain; and demodulating the frequency domain-separated response signals.

45. A method as defined in claim 42 further comprising the steps of:

originating the optical beam for each test mass from a laser light source;

positioning the laser light source at a physically separated location from each test mass; and guiding the optical beam through fiber optic cabling from the laser light source to each test mass.

* * * * *